United States Patent
Evans

(10) Patent No.: US 7,736,100 B2
(45) Date of Patent: Jun. 15, 2010

(54) THREAD TAP ADAPTER

(76) Inventor: Eliot Evans, 505-410th St., Joice, IA (US) 50446

( * ) Notice: Subject to any disclaimer, the term of this patent is extended or adjusted under 35 U.S.C. 154(b) by 961 days.

(21) Appl. No.: 11/511,014

(22) Filed: Aug. 28, 2006

(65) Prior Publication Data

US 2007/0048099 A1    Mar. 1, 2007

Related U.S. Application Data

(60) Provisional application No. 60/711,472, filed on Aug. 26, 2005.

(51) Int. Cl.
*B23B 35/00* (2006.01)
(52) U.S. Cl. .............. 408/1 R; 408/239 R; 279/83
(58) Field of Classification Search ......... 408/120–123, 408/226, 239 R, 215, 222, 239 A, 238; 279/83, 279/143, 145; 81/121.1, 124.3, 124.6, 124.7; 470/198, 207
See application file for complete search history.

(56) References Cited

U.S. PATENT DOCUMENTS

| | | | |
|---|---|---|---|
| 1,184,711 A * | 5/1916 | Baxter et al | 81/63 |
| 1,346,235 A * | 7/1920 | Muller | 408/112 |
| 2,680,257 A * | 6/1954 | Haugeland | 408/141 |
| 3,364,510 A * | 1/1968 | Johnson | 408/123 |
| 4,095,917 A * | 6/1978 | Wesner | 408/239 R |
| 4,097,182 A * | 6/1978 | Rolnick | 408/239 R |
| 4,149,820 A * | 4/1979 | Newlin | 408/120 |
| 4,818,157 A * | 4/1989 | Kouvelis | 408/240 |
| 4,856,946 A * | 8/1989 | Park | 408/122 |
| 5,037,251 A | 8/1991 | Roth | |
| 5,213,347 A | 5/1993 | Rulon et al. | |
| D349,024 S * | 7/1994 | Doffee | D8/14 |
| 7,442,128 B2 * | 10/2008 | Leonard | 470/198 |

FOREIGN PATENT DOCUMENTS

| | | | | |
|---|---|---|---|---|
| CA | 2265054 A1 | * | 9/2000 | |
| DE | 19629352 A1 | * | 1/1998 | |
| DE | 19754518 A1 | * | 6/1999 | |
| JP | 03178725 A | * | 8/1991 | |
| JP | 11104917 A | * | 4/1999 | |
| JP | 2001150245 A | * | 6/2001 | |

* cited by examiner

*Primary Examiner*—Daniel W Howell
(74) *Attorney, Agent, or Firm*—Patterson Thuente Christensen Pedersen, P.A.

(57) ABSTRACT

A thread tap adapter for use with a standard thread tap having a square profile driving end is disclosed. Specifically, the thread tap adapter may include an outer surface having a substantially hexagonal profile so that the adapter may be engaged with a wrench, and an inner surface having a substantially square profile so that the adapter engages the driving end of a standard thread tap. The adapter may additionally include means for securing the standard thread tap.

17 Claims, 10 Drawing Sheets

THREAD TAP ADAPTER

RELATED APPLICATION

This application claims the benefit of U.S. Provisional Application No. 60/711,472, entitled THREAD TAP ADAPTER, filed Aug. 26, 2005, which is herein incorporated by reference in its entirety.

FIELD OF THE INVENTION

The present invention relates to tapping holes. More specifically, the present invention relates to a thread tap adapter for use with conventional thread taps.

BACKGROUND OF THE INVENTION

In the metalworking and fabrication fields, the need to create threads in a hole to receive a screw or bolt has existed for quite some time. Many existing devices available for driving a thread tap into a hole are unnecessarily large and cumbersome, especially when one is attempting to tap a hole in an area of limited space. Some devices for driving a tap, such as T-handle wrenches with a collet-type engagement are as long as the tap itself. That arrangement wastes valuable space, making it unusable in tight confines.

Further, three-jaw chucks such as those commonly found on hand drills or drill presses, do an inadequate job of engaging the square profile of a tap. The three-jaws cannot securely engage the four flats of a thread tap. Additionally, six-point sockets or box wrenches are not suited for engaging the square profile of a tap, as a square profile does not securely fit inside a hexagonal profile.

U.S. Pat. No. 5,213,347 to Rulon et al., discloses a tap adapter for use with a ratchet. The tap adapter looks similar to a standard socket, and engages a ratchet just like a socket does. However, Rulon et al. does not solve the problem of how to engage a thread tap into a three-jaw chuck. The outer profile of his tap adapter is cylindrical and would not be able to be held in a chuck if needed. Additionally, in situations where space immediately above the tap is very tight, Rulon's tap adapter requires enough vertical space for a ratchet.

U.S. Pat. No. 5,037,251 to Roth discloses a thread tap having not only the traditional square end profile, but also a shank having a hexagonal profile. However, tap users would need to replace their entire set of taps at a substantially high cost in order to enjoy the benefits of Roth's invention. Additionally, thread taps having a hexagonal shank profile are more complicated and therefore more expensive to manufacture than standard taps. Taps are very hard and brittle, and often break during use. Having to replace higher-cost taps is not desirable for consumers.

SUMMARY OF THE INVENTION

The present invention comprises an adapter for use with a standard thread tap having a square profile driving end. Specifically, the invention comprises an outer surface having a substantially hexagonal profile so that the adapter may be engaged with a wrench, and an inner surface having a substantially square profile so that the adapter engages the driving end of a standard thread tap.

An advantage of the present invention is that when installed on a tap, the thread tap adapter adds no additional height or length to the tap. A further advantage of the present invention is that when installed on a tap, the tap may be driven with an open-end, box-end, or adjustable crescent wrench by accessing the adapter from the side. These advantages allow for the use of a tap in applications where space above the tap is limited.

A further advantage of the present invention is that the thread tap apparatus is simple and inexpensive, and may be used with a wide range of standard existing taps and tap sizes.

A still further advantage of the present invention is that the thread tap apparatus can be used when a user wishes to drive a tap with a hand drill, drill press, or similar tool having a three-jaw chuck. The hexagonal profile of the present invention provides a secure fitment in a three-jaw chuck.

A further advantage of the present invention is that the thread tap apparatus may be used in combination with a socket and ratchet.

A further advantage of the present invention is that the thread tap adapter can be utilized with conventional thread taps so as to reduce costs associated with broken or worn thread taps.

Other advantages of the present invention will become apparent from the following detailed description and accompanying drawings.

BRIEF DESCRIPTION OF THE DRAWINGS

The invention can be more completely understood and appreciated by referring to the following more detailed description of the presently preferred exemplary embodiments of the invention in conjunction with the accompanying drawings, of which.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances, well-known methods, procedures, and components have not been described in detail so as to not unnecessarily obscure aspects of the present invention.

Figure 1:
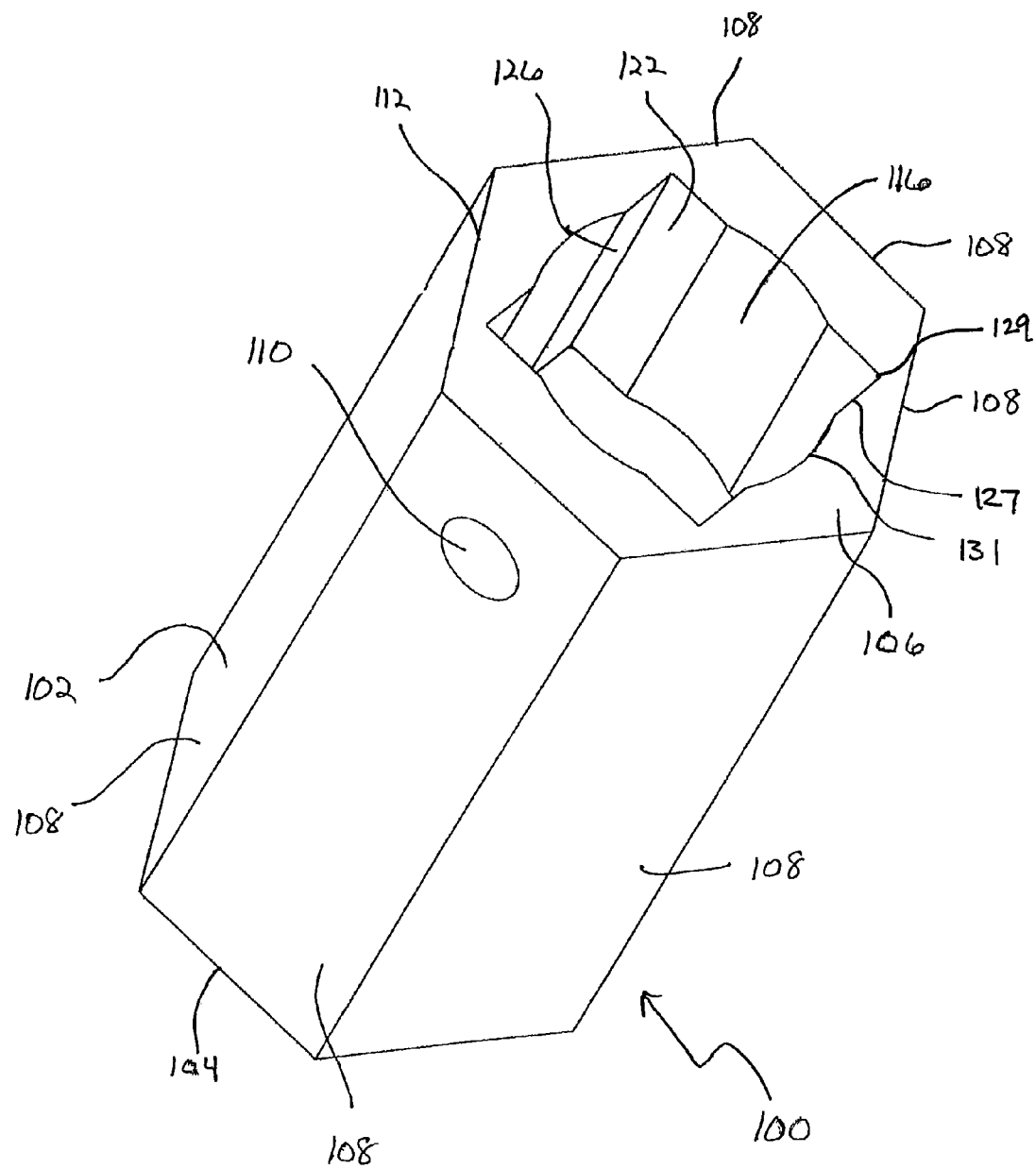
FIG. 1 is a perspective view of a thread tap adapter according to one embodiment of the present invention.
Figure 4:
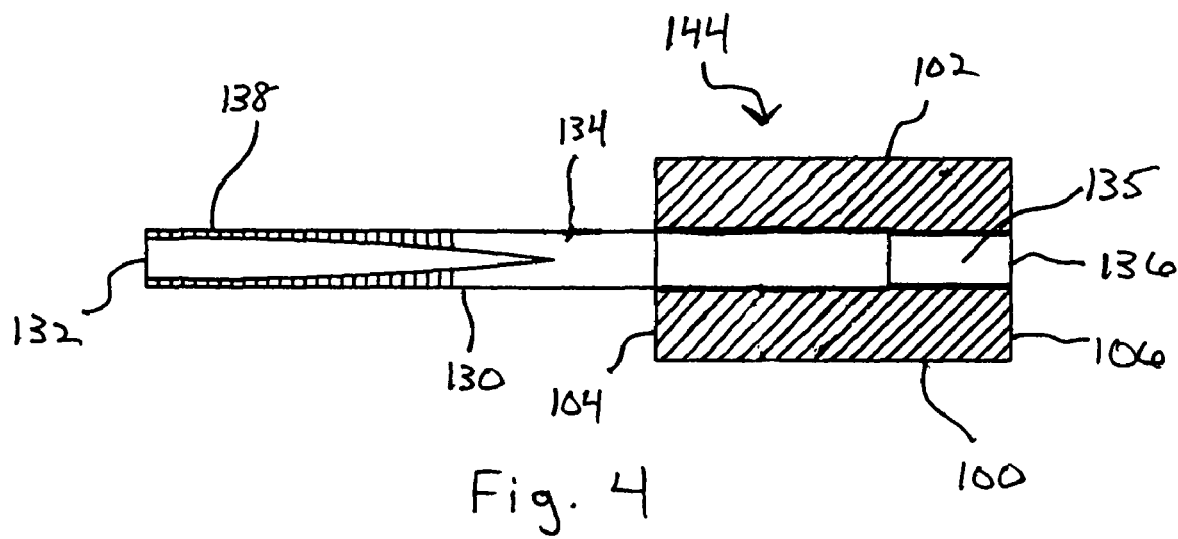
FIG. 4 is a side cross-sectional view of a thread tap adapter according to one embodiment of the present invention, installed on a standard thread tap.
Figure 5:
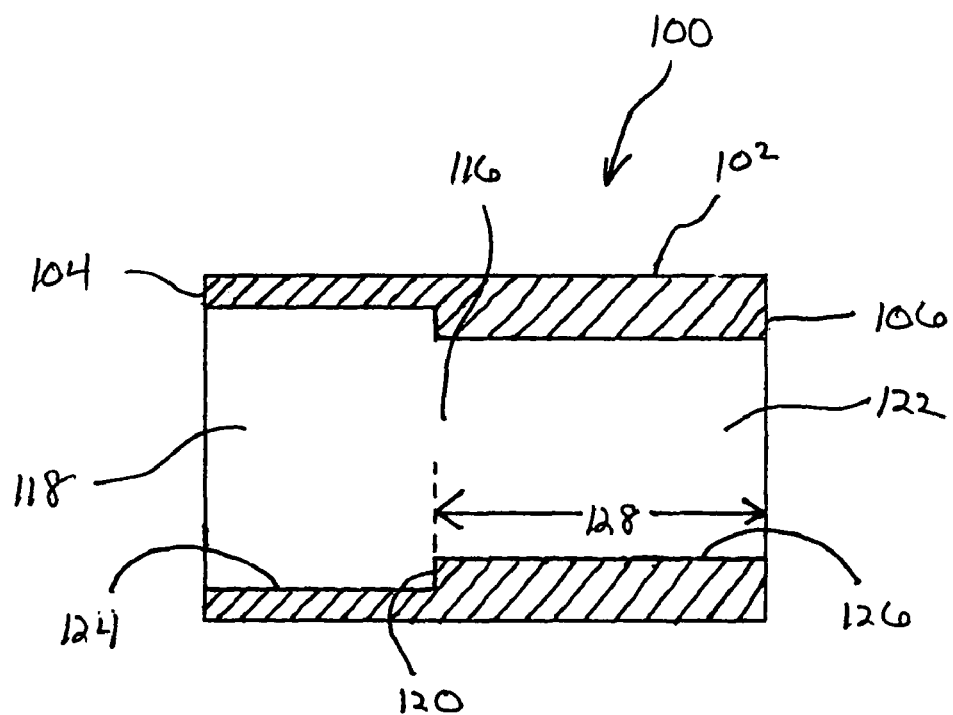
FIG. 5 is a side cross-sectional view of a thread tap adapter according to one embodiment of the present invention.
Figure 6:
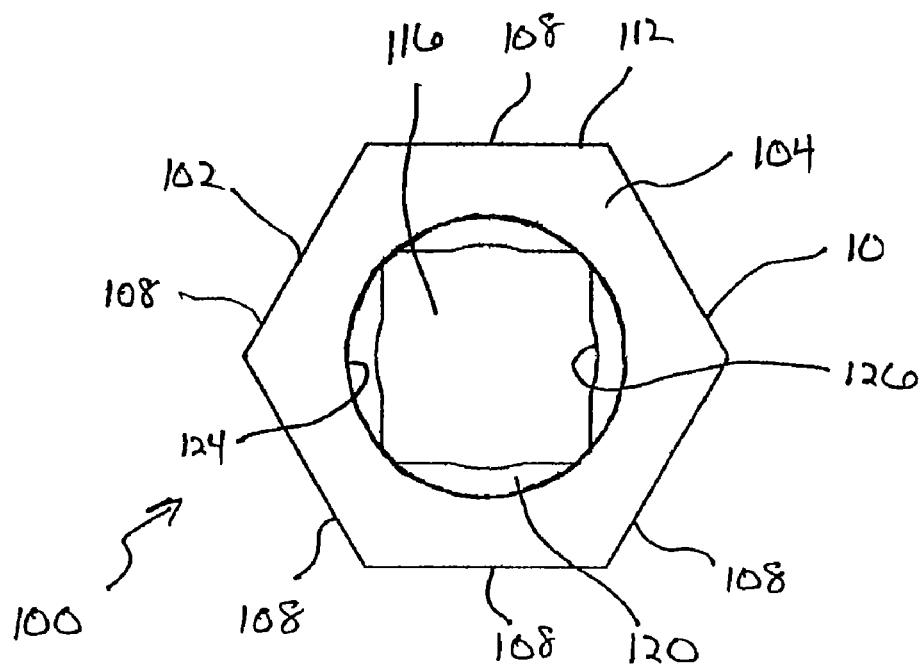
FIG. 6 is a bottom elevational view of a thread tap adapter according to one embodiment of the present invention.
Figure 7:
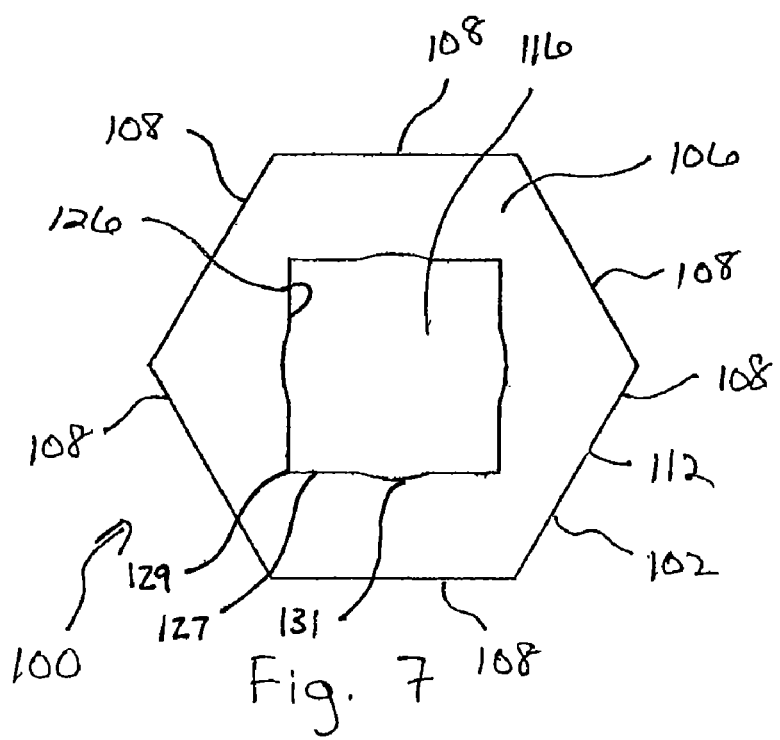
FIG. 7 is a top elevational view of a thread tap adapter according to one embodiment of the present invention.

As illustrated in FIGS. 1-7, an embodiment of a thread tap adapter 100 can comprise an adapter body 102, a first end 104 and a second end 106. Adapter body 102 generally comprises a plurality of side surfaces 108 and can include a bore 110 in one or more of the side surfaces 108. In one presently preferred embodiment of thread tap adapter 100, adapter body 102 can comprise six side surfaces 108 so as to present a substantially hexagonal perimeter 112 as illustrated in FIGS. 1, 6 and 7. In another contemplated embodiment, adapter body 102 can comprise three side surfaces 108 specifically contemplated for use with three jaw chucks.

Figure 3:
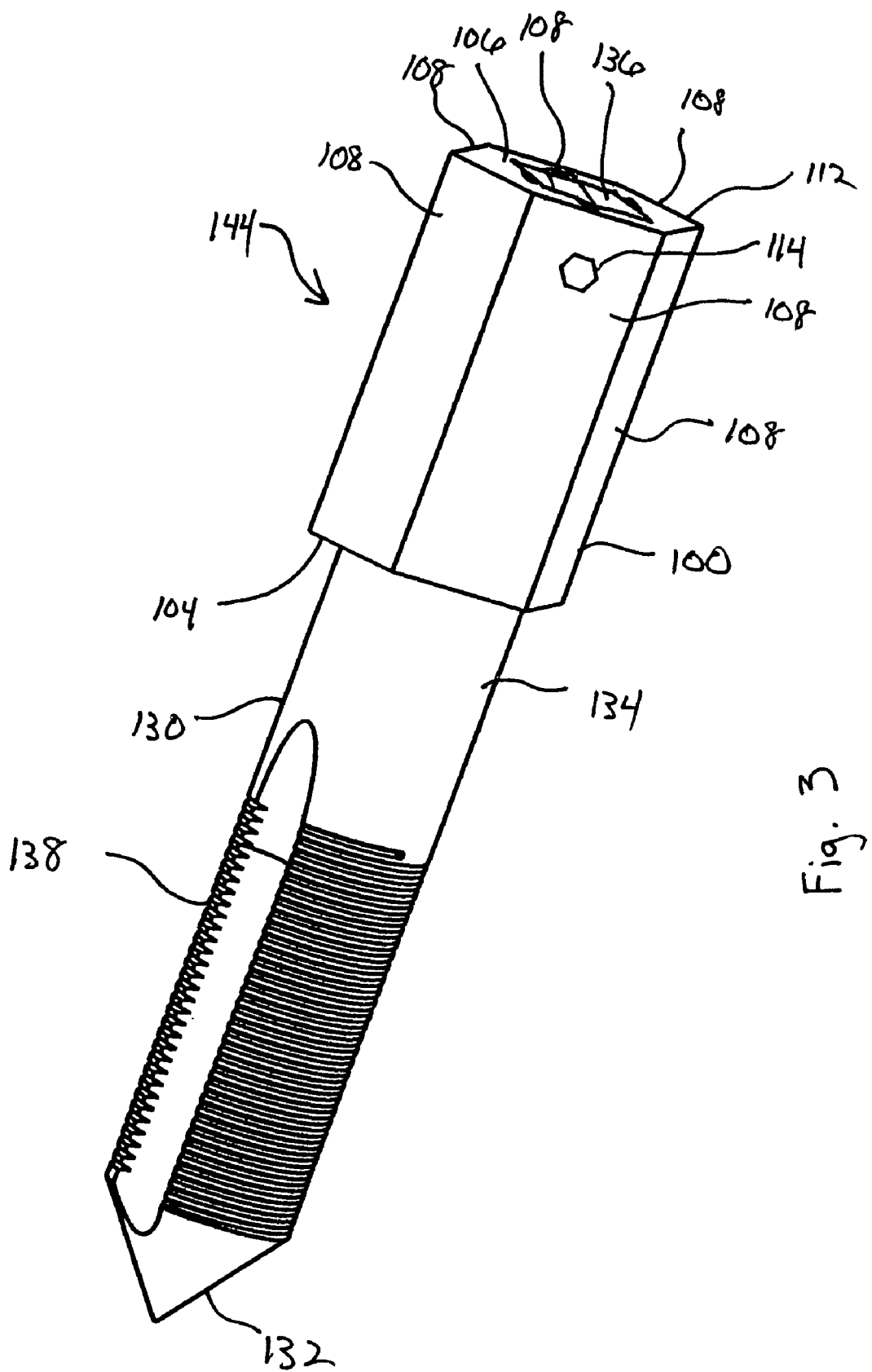
FIG. 3 is a further perspective view of a thread tap adapter according to one embodiment of the present invention, installed on a standard thread tap.

Adapter body 102 and more specifically, hexagonal perimeter 112 can be sized accordingly for use with standard wrench sizes, in either metric or English units. Bore 110 can be threaded so as to securely receive a set screw 114 as illustrated in FIG. 3. Thread tap adapter 100 can comprise suitable materials of construction such as, for example, cold rolled steel, stainless steel, aluminum and various steel alloys such as, for example, 4140, S7, A2, D2 as well as other suitable materials including but not limited to appropriate plastic polymer and other material known to those of skill in the art of metals and metal fabrication.

As illustrated in FIG. 5, adapter body 102 comprises a receiving throughbore 116 between connecting the first end 104 and a second end 106. Receiving throughbore 116 comprises a shank receiving portion 118, and interior flange 120 and a drive receiving portion 122. Shank receiving portion 118 comprises a shank inner surface 124 defining a substantially cylindrical shank inner surface while drive receiving portion 122 comprises a drive inner surface 126 defining a substantially square-shaped drive inner surface. The drive inner surface 126 further comprising a plurality of inner engaging surfaces 127 adjacent to corners 129. The driver inner surface 126 also can comprise at least one non-engaging surface 131 disposed between two adjacent corners 129. Drive receiving portion 122 comprises a drive depth 128.

Figure 8:
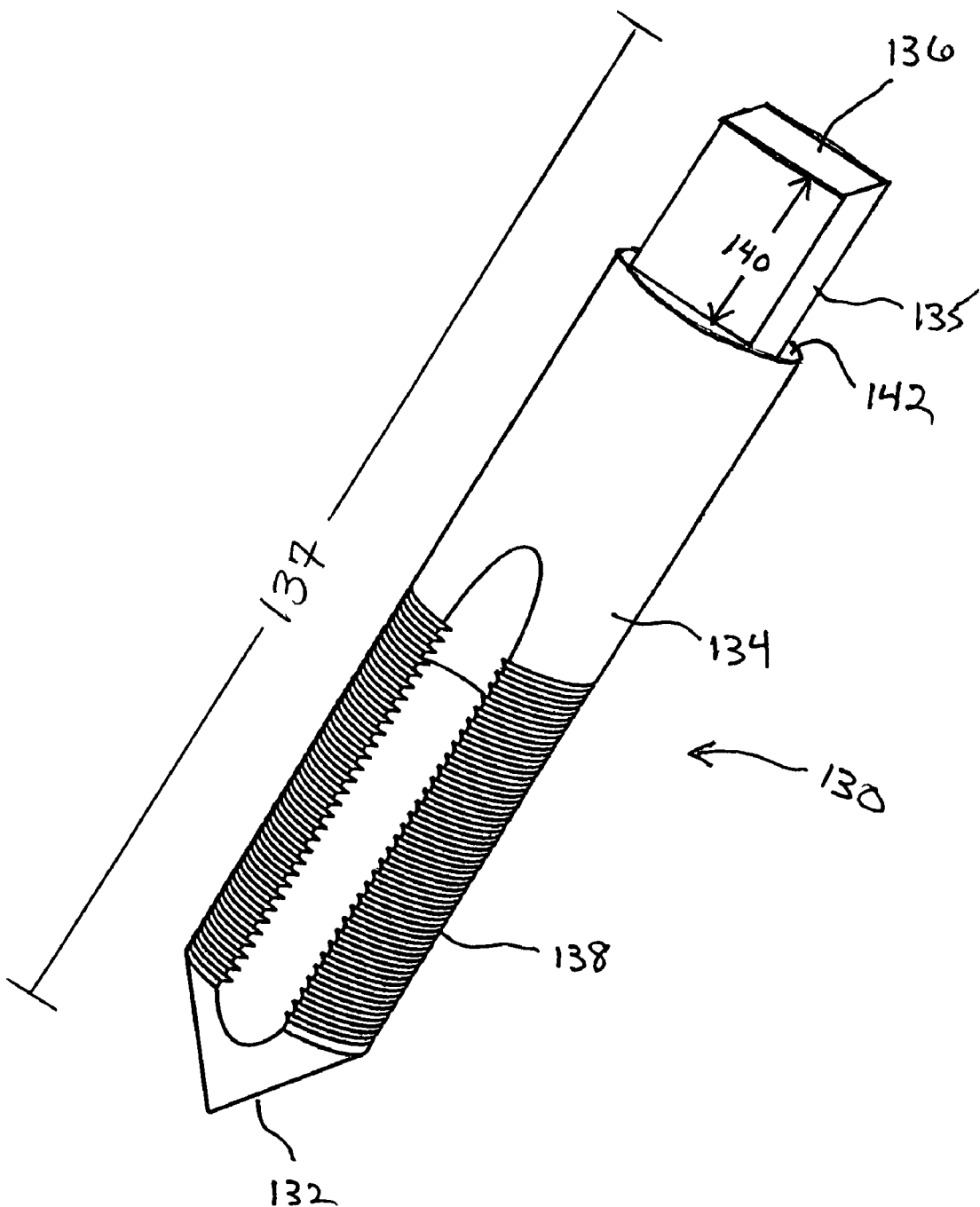
FIG. 8 is a perspective view of a conventional thread tap.

As illustrated in FIG. 8, a conventional thread tap 130 generally comprises a tapping end 132, a tap shank portion 134, a tap drive portion 135 and a drive end 136. Tapping end 132, tap shank portion 134, tap drive portion 135 and drive end 136 collectively result in thread tap 130 having a tap length 137. Tap shank portion 134 comprises a cylindrical cross-section with an exterior tapping thread 138 proximate the tapping end 132. Tap drive portion 135 comprises a substantially square cross section along a drive length 140. Tap shank portion 134 and tap drive portion 135 are operably distinguished at a tap flange 142.

Figure 2:
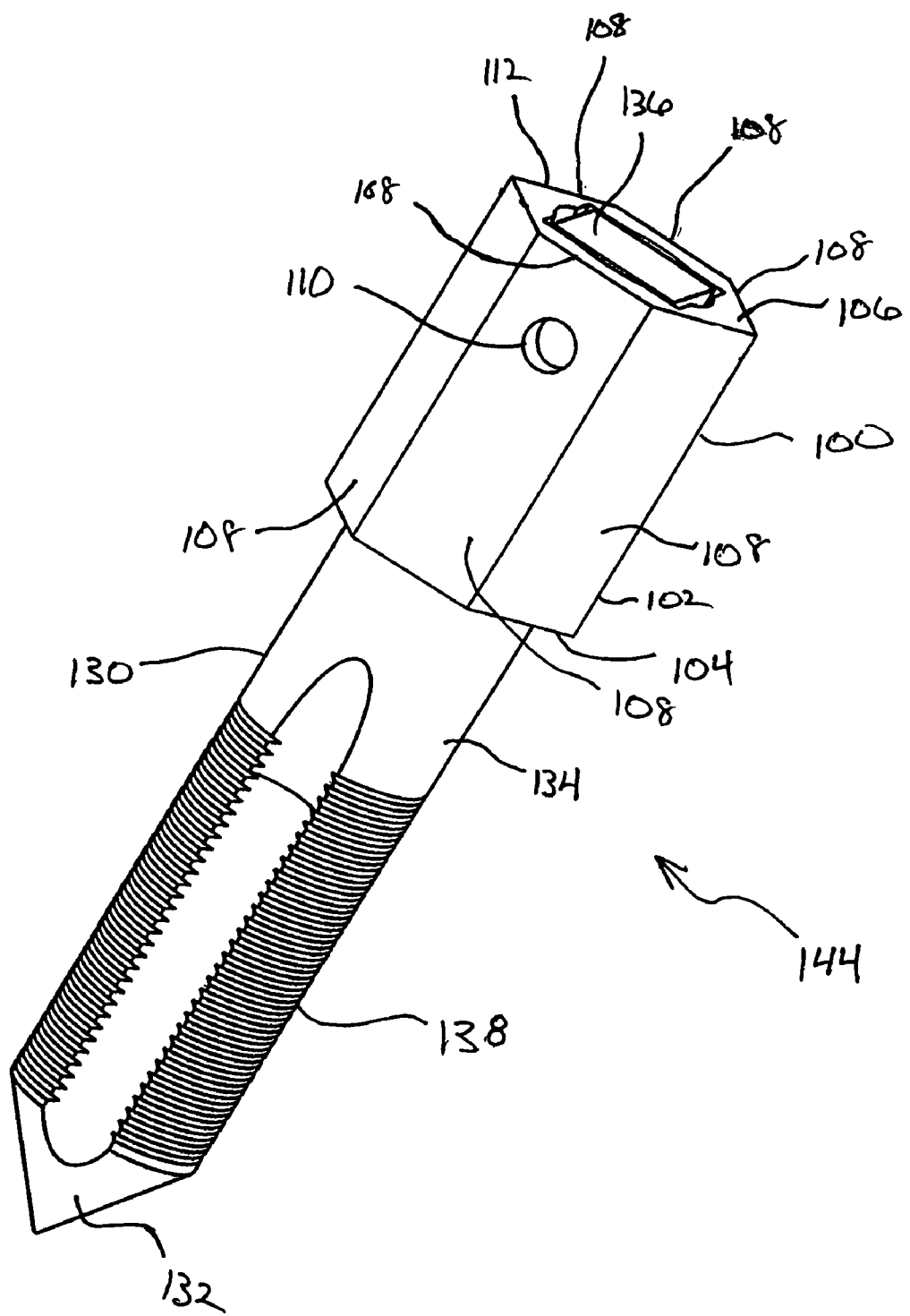
FIG. 2 is a perspective view of a thread tap adapter according to one embodiment of the present invention, installed on a standard thread tap.

Use of thread tap adapter 100 with thread tap 130 to form a thread tapping system 144 is illustrated in FIGS. 2, 3 and 4. Generally, drive end 136 is slidably inserted into first end 104. The square cross-section of drive inner surface 126 slidingly receives the tap drive portion 135 until the tap flange 142 slidingly abuts the interior flange 120. Drive length 140 and drive depth 128 are preferably, substantially equal such that when top flange 142 and interior flange 120 are positioned in abutted relation, drive end 136 and second end 106 are in a substantially flush orientation.

Figure 9:
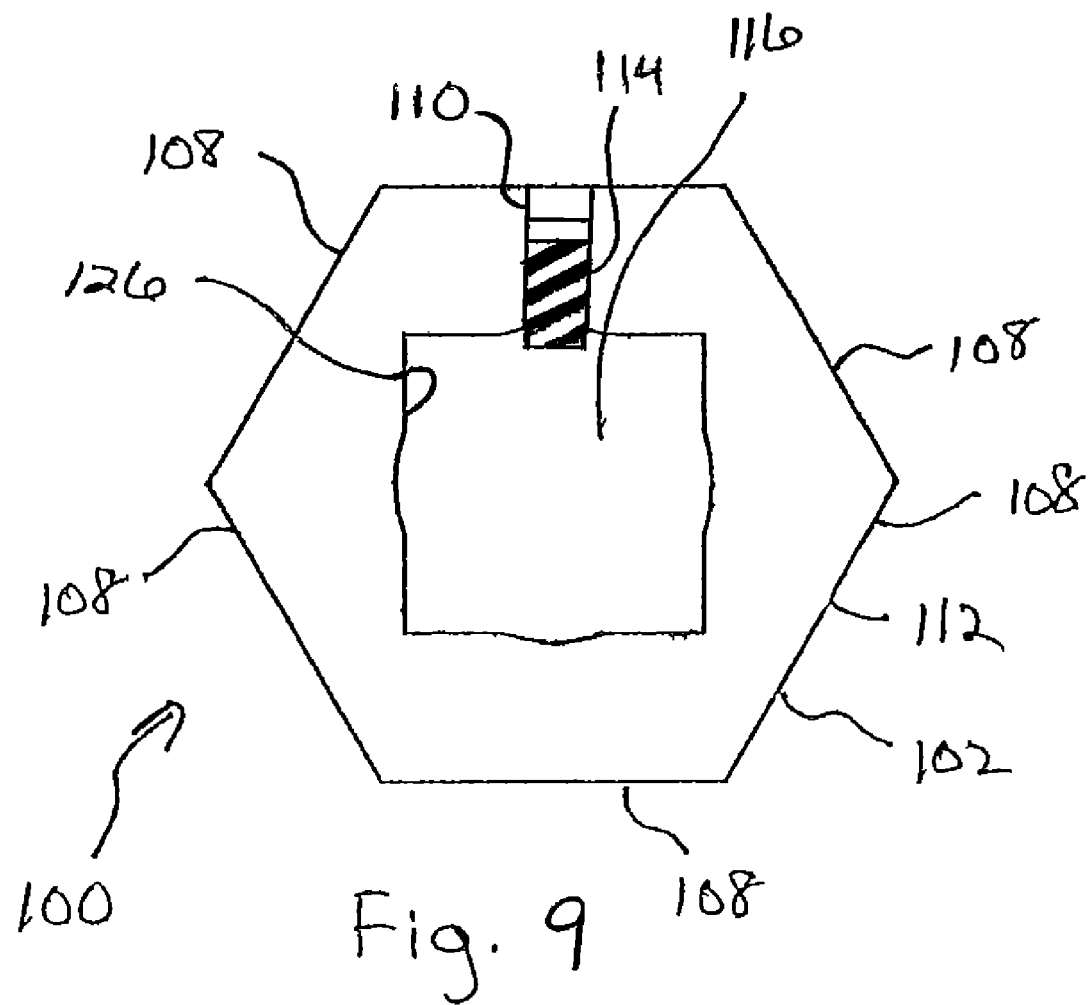
FIG. 9 is a cross-sectional view of a thread tap adapter according to one embodiment of the present invention.
Figure 10:
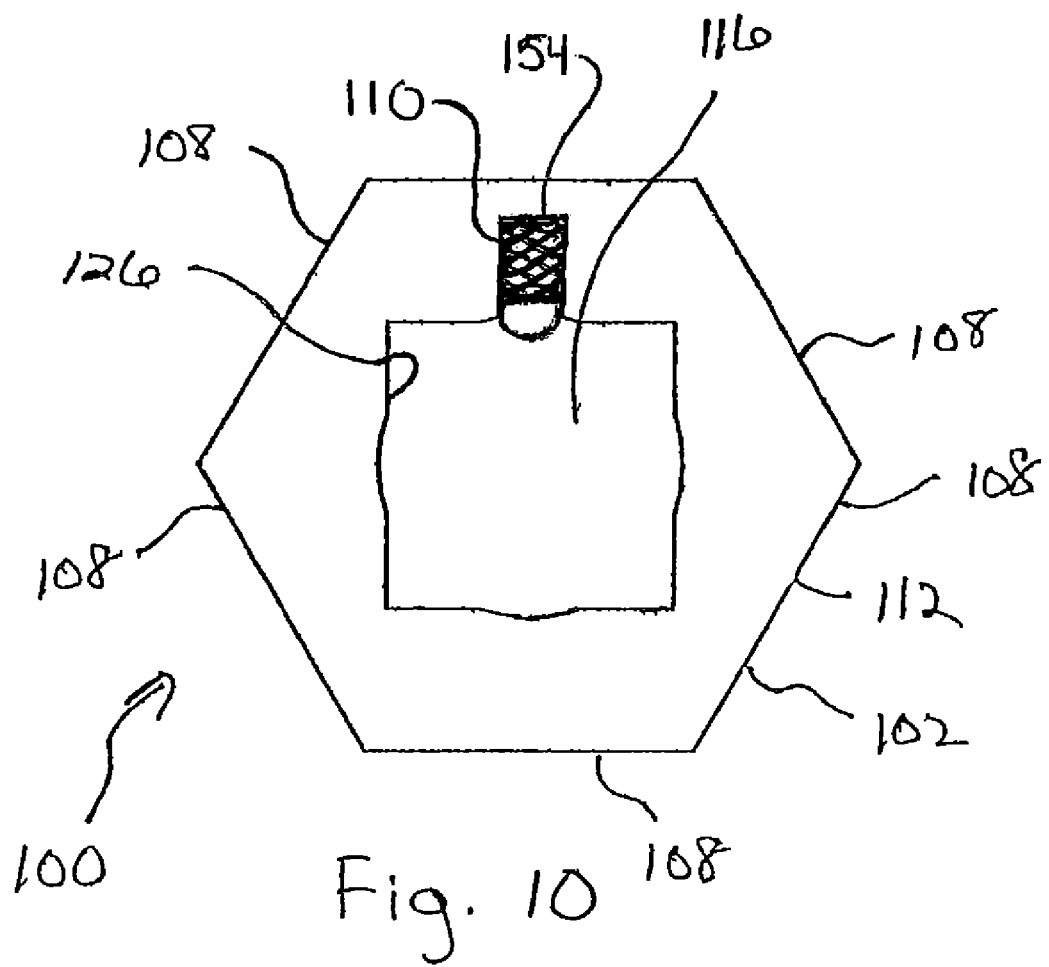
FIG. 10 is a cross-sectional view of a thread tap adapter according to one embodiment of the present invention.
Figure 11:
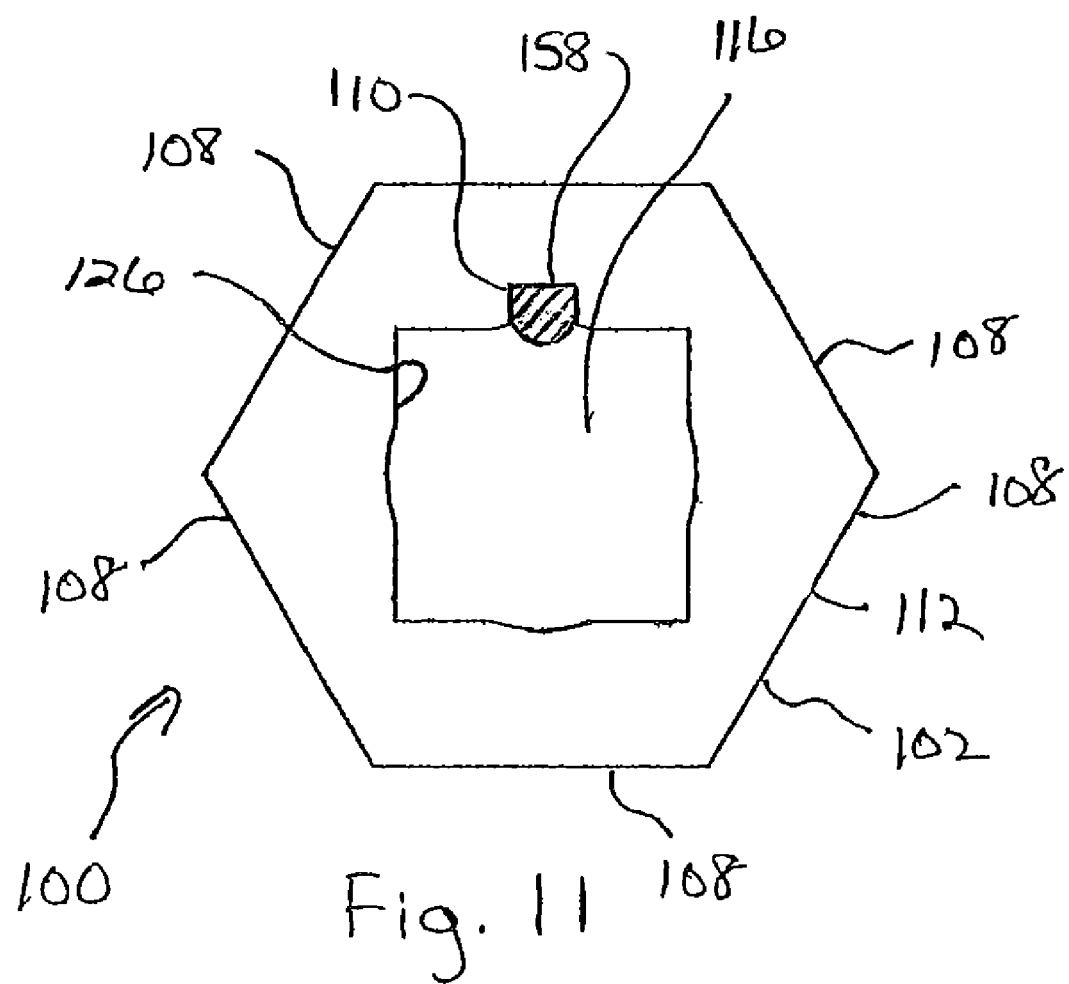
FIG. 11 is a cross-sectional view of a thread tap adapter according to one embodiment of the present invention.
Figure 12:
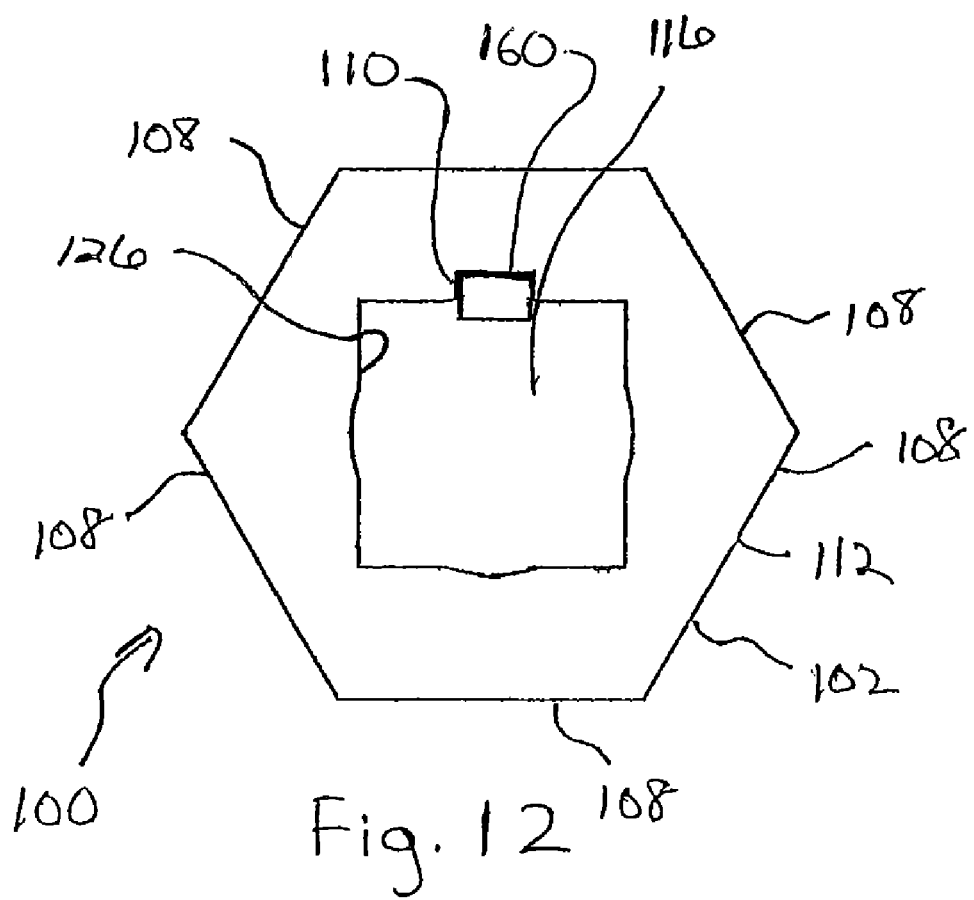
FIG. 12 is a cross-sectional view of a thread tap adapter according to one embodiment of the present invention.

Once top flange 142 and interior flange 120 are in abutted relation, a securing means such as set screw 114 can be threadably inserted into bore 110 such that the set screw 114 engages a side of the tap drive portion 136 so as to assist in retaining the coupled relation between the thread tap adapter 100 and the thread tap 130 as shown in FIG. 9. Alternatively, thread tap adapter 100 can comprise internal securing means within receiving throughbore 116 such as, for example, spring loaded bearings 154, grip enhancing polymers 158 or compression arms 160 for assisting with the retention of thread tap 130 with thread tap adapter 100 as shown in FIGS. 10-12.

When properly coupled, thread tap adapter 100 provides an ability to use thread tap 130 for tapping holes without adding additional length to thread tap 130 as drive end 136 and second end 106 are in a substantially flush orientation. Essentially, when coupled, thread tap adapter 100 and thread tap 130 comprise a length equal to tap length 137. As such, conventional tools such as, for example, crescent wrenches, adjustable wrenches, ratcheting wrenches, pliers and the like can be utilized without requiring additional length or height spacing to access the drive end 136 of thread tap 130. The tools can engage the hexagonal perimeter 112 of thread tap adapter 100 so as to provide the necessary torque for tapping a hole with the thread tap 130. Alternatively, hexagonal perimeter 130 can provide an ability to utilize tools having three pronged chucks such as, for example, a hand drill and a drill press while similarly reducing additional height or length requirements in confined spaces. As the life of a thread tap 130 is limited such that they require frequent replacement, use of thread tap adapter 100 provides a cost-effective ability to utilize any conventional thread tap 130 as previously described without requiring special fabrication of the tap drive portion 136 that results in an increased cost to manufacture the specialized thread, which consequently increases the purchase price while still requiring frequent replacement as the specialized tap has the same finite useful life.

While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

What is claimed:

1. A thread tap adapter comprising:
    an adapter body having a first end, a second end, a plurality of exterior side surfaces, and a throughbore extending between the first end and the second end;
    wherein said throughbore includes a shank receiving portion proximate the first end and a drive receiving portion having a substantially square-shape and defining a plurality of inner engaging surfaces adjacent to corners for engaging a drive portion of a thread tap proximate the second end and at least one non-engaging surface disposed between adjacent corners;
    wherein the drive receiving portion further comprises a bore intersecting the at least one non-engaging surface and adapted to receive a securing means for engaging the drive portion of the thread tap to secure the drive portion of the thread tap within the drive receiving portion.

2. The adapter of claim 1, wherein said adapter body comprises at least three exterior side surfaces.

3. The thread tap adapter of claim 2, wherein said adapter body comprises six exterior side surfaces defining a hexagonal perimeter.

4. The thread tap adapter of claim 1, wherein said drive receiving portion is defined by a drive inner surface and a drive depth such that a drive end on the shank portion is flush with the second end of the adapter body when the thread tap is inserted into the throughbore.

5. The thread tap adapter of claim 1 wherein said securing means is selected from the group comprising: a bore and set screw, a spring loaded bearing, a grip enhancing polymer and a compression arm.

6. A system for tapping a hole for threads comprising:
a thread tap having a shank portion and a drive portion;
a thread tap adapter having a first end, a second end, a plurality of exterior side surfaces, and a throughbore extending between the first end and the second end, wherein said throughbore includes a shank receiving portion proximate the first end and a drive receiving portion having a substantially square-shape and defining a plurality of inner engaging surfaces adjacent to corners for engaging the drive portion proximate the second end and at least one non-engaging surface disposed between adjacent corners, wherein the drive receiving portion further comprises a bore intersecting the at least one non-engaging surface and adapted to receive a securing means for engaging the drive portion of the thread tap to secure the drive portion of the thread tap within the drive receiving portion; and
a tool for engaging the exterior side surfaces of the thread tap adapter, wherein said thread tap and said thread tap adapter are slidably engaged with each other.

7. The system of claim 6, wherein a drive end on the thread tap is flush with the second end of the thread tap adapter such that slidably engaging the thread tap and thread tap adapter does not exceed a tap length of the thread tap.

8. The system of claim 6, wherein the thread tap adapter includes three exterior sides such that the tool can engage the thread tap adapter with a three jaw chuck.

9. The system of claim 8, wherein the tool is selected from the group comprising: a hand drill and a drill press.

10. The system of claim 6, wherein the thread tap adapter includes six exterior sides defining a hexagonal perimeter.

11. The system of claim 10, wherein the tool for engaging the hexagonal perimeter is selected from the group comprising: a crescent wrench, an adjustable wrench, a ratcheting wrench and pliers.

12. The system of claim 6, wherein said securing means is selected from the group comprising: a bore and set screw, a spring loaded bearing, a grip enhancing polymer and a compression arm.

13. A method for tapping bores comprising:
providing a thread tap and a thread tap adapter;
inserting the thread tap into a receiving throughbore within the thread tap adapter to form a thread tap assembly, wherein a drive portion of the thread tap resides within a drive receiver portion of the receiving throughbore;
engaging the drive portion of the thread tap with a plurality of inner engaging surfaces defined by the drive receiver portion of the receiving throughbore and adjacent to corners of the drive receiver portion;
positioning a securing means into a bore in the thread tap adapter intersecting a non-engaging surface disposed between adjacent corners of the drive receiver portion;
engaging the drive portion of the thread tap with the securing means to secure the drive portion of the thread tap within the drive receiver portion; and
engaging a plurality of exterior surfaces on the thread tap adapter with a tool such that the thread tap assembly is turned for tapping bores.

14. The method of claim 13, further comprising: securing the drive portion of the thread tap within the drive receiver portion of the receiving throughbore.

15. The method of claim 13, further comprising:
reducing an overall length of the thread tap assembly by positioning a drive surface on the drive portion flush with an adapter end proximate the drive receiving portion.

16. The method of claim 15, further comprising:
accessing a bore in a limited access space.

17. The method of claim 13, further comprising:
removing the thread tap from the receiving throughbore such that a second thread tap can be slidably inserted into the receiving throughbore.

* * * * *